(12) United States Patent
Suh et al.

(10) Patent No.: US 12,328,289 B2
(45) Date of Patent: Jun. 10, 2025

(54) PERSONALIZED MESSAGING SERVICE SYSTEM AND PERSONALIZED MESSAGING SERVICE METHOD

(71) Applicant: DEAR U CO., LTD., Seoul (KR)

(72) Inventors: Seunghyun Suh, Gyeonggi-do (KR); Jinyoung Park, Seoul (KR)

(73) Assignee: DEAR U CO., LTD., Seoul (KR)

( * ) Notice: Subject to any disclaimer, the term of this patent is extended or adjusted under 35 U.S.C. 154(b) by 0 days.

(21) Appl. No.: 18/564,126

(22) PCT Filed: May 25, 2022

(86) PCT No.: PCT/KR2022/007393
§ 371 (c)(1),
(2) Date: Nov. 27, 2023

(87) PCT Pub. No.: WO2022/250438
PCT Pub. Date: Dec. 1, 2022

(65) Prior Publication Data
US 2024/0275744 A1    Aug. 15, 2024

(30) Foreign Application Priority Data
May 27, 2021   (KR) .......................... 10-2021-0068237

(51) Int. Cl.
*H04L 51/04* (2022.01)
*H04L 51/10* (2022.01)

(52) U.S. Cl.
CPC .............. *H04L 51/04* (2013.01); *H04L 51/10* (2013.01)

(58) Field of Classification Search
CPC ................................. H04L 51/04; H04L 51/10
See application file for complete search history.

(56) References Cited

U.S. PATENT DOCUMENTS 10,390,056 B2 *   8/2019  Jabara ................ H04N 21/4882
11,010,535 B1 *   5/2021  Periasamy ............ G06F 40/151
(Continued)

FOREIGN PATENT DOCUMENTS

KR    10-2008-0006955 A    1/2008
KR    10-2012-0137568 A    12/2012
(Continued)

OTHER PUBLICATIONS

International Search Report for PCT/KR2022/007393 mailed on Aug. 3, 2022.

*Primary Examiner* — William G Trost, IV
*Assistant Examiner* — Abdelbasst Talioua
(74) *Attorney, Agent, or Firm* — The PL Law Group, PLLC

(57) ABSTRACT

A personalized messaging service system includes an artist terminal in which an artist app is installed and communicates with a central server, and an artist message including an identification code is registered through the artist app, a user terminal on which each user app is installed and communicates with a central server, and a personalized message converted from the artist message is displayed based on the identification code, and a central server communicating with the user terminal and the artist terminal. The user app includes a user login service unit providing login services for user accounts, a message sending control unit to limit sending of user messages according to predetermined standards, based on user information of the user account, and a user chat service unit to send the user message and display a personalized message converted from the artist message based on the identification code in a chat window.

7 Claims, 5 Drawing Sheets

(56) References Cited

U.S. PATENT DOCUMENTS

| | | | | |
|---|---|---|---|---|
| 2006/0078127 | A1* | 4/2006 | Cacayorin | H04L 9/083 380/286 |
| 2008/0150678 | A1* | 6/2008 | Giobbi | G08C 17/02 340/5.2 |
| 2011/0197148 | A1* | 8/2011 | Rhee | H04L 51/52 715/753 |
| 2012/0054369 | A1* | 3/2012 | Shafi | G06F 16/972 709/246 |
| 2014/0032684 | A1* | 1/2014 | Chung | H04L 12/1822 709/206 |
| 2014/0156762 | A1* | 6/2014 | Yuen | H04L 51/063 709/206 |
| 2014/0173622 | A1* | 6/2014 | Thompson | G06F 9/5005 718/104 |
| 2014/0365586 | A1* | 12/2014 | Friborg, Jr. | H04L 51/214 709/206 |
| 2015/0149153 | A1* | 5/2015 | Werth | G06F 40/30 704/9 |
| 2016/0005135 | A1* | 1/2016 | Bokestad | G06Q 30/0231 705/319 |
| 2016/0140619 | A1* | 5/2016 | Soni | H04L 51/52 705/14.66 |
| 2017/0032336 | A1* | 2/2017 | Connell | G06Q 20/10 |
| 2017/0032344 | A1* | 2/2017 | Attolini | H04L 67/30 |
| 2017/0070586 | A1* | 3/2017 | Hargraves | H04L 67/34 |
| 2017/0317963 | A1* | 11/2017 | Gupta | G06N 5/01 |
| 2018/0102992 | A1* | 4/2018 | Pysanets | H04L 51/58 |
| 2019/0149497 | A1* | 5/2019 | Lieu | H04L 51/18 709/206 |
| 2019/0149498 | A1* | 5/2019 | Lieu | H04L 67/306 709/206 |
| 2019/0288966 | A1* | 9/2019 | Attolini | G06Q 50/01 |
| 2021/0064624 | A1* | 3/2021 | Carbune | G06Q 50/26 |
| 2023/0156245 | A1* | 5/2023 | Resnick | H04N 21/23418 725/109 |
| 2023/0269094 | A1* | 8/2023 | Zhang | G06F 21/629 713/176 |

FOREIGN PATENT DOCUMENTS

| | | |
|---|---|---|
| KR | 10-2016-0113833 A | 10/2016 |
| KR | 10-2018-0046136 A | 5/2018 |
| KR | 10-2019-0101212 A | 8/2019 |
| KR | 10-2339430 B1 | 12/2021 |

\* cited by examiner

FIG. 5

The number of characters you can reply to is added for each subscription anniversary, and this benefit will remain until the next subscription anniversary.
Based on anniversary, number of characters that can be replied to 1~49 days: 30 characters
50 days: 50 characters
77 days: 77 characters
100 days: 100 characters
150 days: 150 characters
200 days: 200 characters
300 days: 300 characters
365 days: 365 characters
400 days: 400 characters
500 days: 500 characters 26 days -> 30 characters allowed for reply 68 days -> 50 characters allowed for reply When subscribing for 500 days -> 500 characters allowed for reply

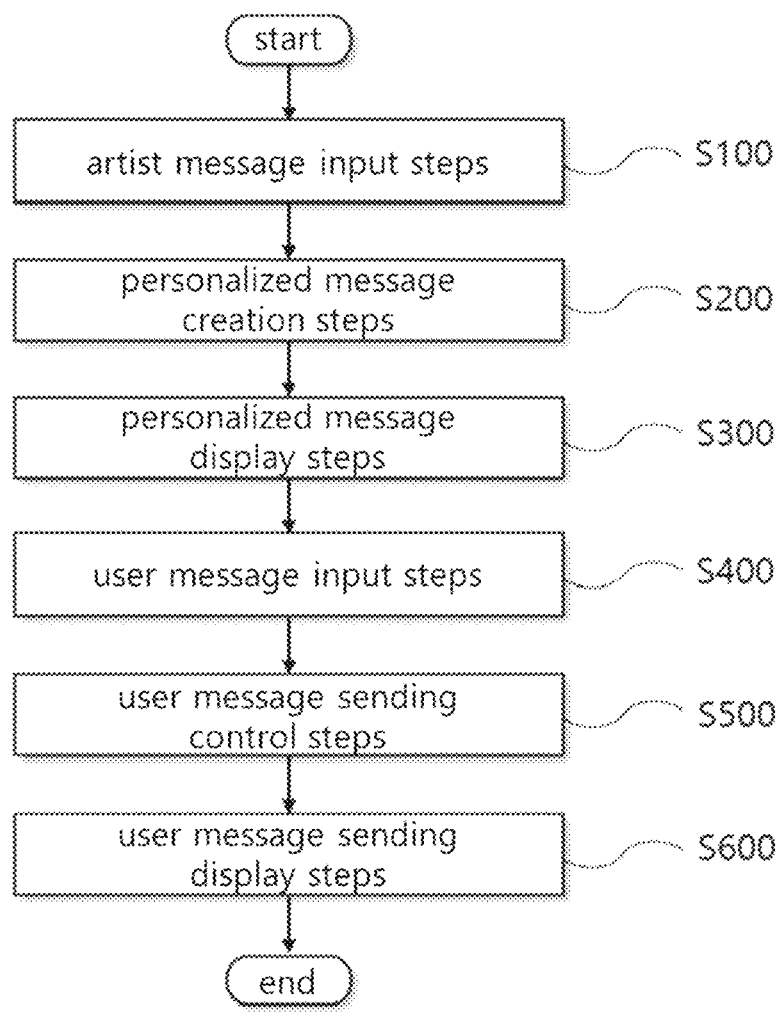

PERSONALIZED MESSAGING SERVICE SYSTEM AND PERSONALIZED MESSAGING SERVICE METHOD

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/007393, filed May 25, 2022, which claims priority to the benefit of Korean Patent Application No. 10-2021-0068237 filed in the Korean Intellectual Property Office on May 27, 2021, the entire contents of which are incorporated herein by reference.

BACKGROUND

1. Technical Field

The present invention relates to a personalized messaging service system and a personalized messaging service method, more specifically, when multiple users send individual user messages to a specific artist who is subscribed to a personalized messaging service, it relates to a personalized messaging service system and a personalized messaging service method that restricts the sending function of user messages based on customer evaluation information such as subscription date.

2. Background Art

Methods for transmitting information between users using the Internet include Instant Message Service (IMS) and Social Network Service (SNS). Through the instant messaging service, users can not only send and receive messages as if they were talking directly 1:1, but also allow multiple people to chat together through a single chat window. In addition to simply delivering messages, the instant message server can also provide the function of sending emoticons, flash cones, gift cones, etc. to the conversation partner through a messenger chat window, or sending files.

A social network service is a service that allows users to form personal networks on the Internet and share information related to specific areas of interest or activities. Instant messaging services such as Kakao Talk are widely used as messaging services between individuals, and social network services such as Twitter and Instagram are widely used as channels for communication between celebrities such as celebrities and sports stars and their fans.

However, instant messaging services such as KakaoTalk have introduced a method of using group chat rooms for one-to-many messaging, and in the case of Twitter and Instagram, messages posted by one celebrity are displayed equally to multiple users, communication is simply achieved by multiple users reading the same message, many celebrities (artists) and fans (users) were unable to meet the needs for more private communication from each fan's perspective.

SUMMARY

Accordingly, the technical problem of the present invention has been conceived in this respect, and an object of the present invention is to provide a lipid nanoparticles manufacturing chip for producing lipid nanoparticles.

The problem to be solved by the present invention is to provide a personalized messaging service system that motivates users and at the same time limits the sending function of messages sent to artists based on user evaluation information in order to form a healthy fandom culture in the instant message service between celebrities (artists) and fans (users) where private communication takes place.

Another object of the present invention is to provide a personalized messaging service method performed through the personalized messaging service system.

According to an exemplary embodiment of the inventive concept, a personalized messaging service system comprises an artist terminal in which an artist app is installed and communicates with a central server over a network, and an artist message comprising an identification code is registered through the artist app, at least one user terminal on which each user app is installed and communicates with a central server through the network, and a personalized message converted from the artist message is displayed based on the identification code, and a central server that communicates with the user terminal and the artist terminal using the network, and wherein the user app comprises, a user login service unit that provides login services for user accounts, a message sending control unit configured to limit sending of user messages according to predetermined standards, based on user information of the user account, and a user chat service unit configured to send the user message and display a personalized message converted from the artist message based on the identification code in a chat window.

In an embodiment of the present invention, the message sending control unit may limit the number of characters in the text of an input user message In an embodiment of the present invention, the message sending control unit may limit the number of characters in the text of a user message for each artist to be sent based on a subscription date information for each artist among the user information.

In an embodiment of the present invention, the message sending control unit may comprise a number of characters counting unit in which displays the number of characters of text in a user message that can be sent by the user based on user information, and counts the number of text characters in the user message input from the user and displays at least one of the number of characters currently entered and the number of remaining characters in the chat window, a message input notification unit in which notifies that the message cannot be sent when the user message exceeds the number of characters that can be sent, and a message product presentation unit in which presents message products so that messages can be sent through point or paid product payment for user messages that cannot be sent.

In an embodiment of the present invention, the message input notification unit, when the user message exceeds the number of characters that can be sent, may firstly notify that sending is impossible, and secondarily notify to select to modify the content of a user message or to send the user message through the message product.

In an embodiment of the present invention, the message sending control unit may restrict the inclusion of content comprising at least one of a photo, video, or voice in the input user message.

In an embodiment of the present invention, the message sending control unit may limit the number of characters of the text of the user message to be sent based on a personalized messaging service subscription date information among the user information.

In an embodiment of the present invention, the point may comprise at least one of feedback points granted from a subscribed artist and points awarded when a quick feedback message is provided in response to an artist message.

According to an exemplary embodiment of the inventive concept, a personalized messaging service method may use a personalized messaging service system comprising an artist terminal in which an artist app is installed and communicates with a central server over a network, and an artist message comprising an identification code is registered through the artist app, at least one user terminal on which each user app is installed and communicates with a central server through the network, and a personalized message converted from the artist message is displayed based on the identification code, and a central server that communicates with the user terminal and the artist terminal using the network, and the user app may comprise a step to provide login service for user accounts, a step of restricting the sending of a user message according to a predetermined standard based on user information of the user account when a user message is input from a user, and a step of sending the user message and displaying a personalized message converted from the artist message on a chat window based on the identification code. In an embodiment of the present invention, the step of restricting the sending of user messages may limit the number of characters of text in input user messages.

In an embodiment of the present invention, the step of restricting the sending of user messages may limit the number of characters of text in user messages for each artist to be sent based on subscription date information for each artist among the user information.

According to the exemplary embodiments of the present invention, by limiting the ability to send messages to artists based on user evaluation information such as subscription date, in the one-to-many instant messaging service between artists and users where personal communication takes place, it is possible to motivate users and create a healthy fandom culture at the same time.

However, the effects of the present invention are not limited to the above effects and may be variously expanded without departing from the spirit and scope of the present invention.

BRIEF DESCRIPTION OF THE DRAWINGS

FIG. 5 is an example diagram of a user interface (UI) of a user app of a personalized messaging service method according to an embodiment of the present invention.

FIG. 6 is a flowchart illustrating a personalized messaging service method according to an embodiment of the present invention.

DETAILED DESCRIPTION

Figure 1:
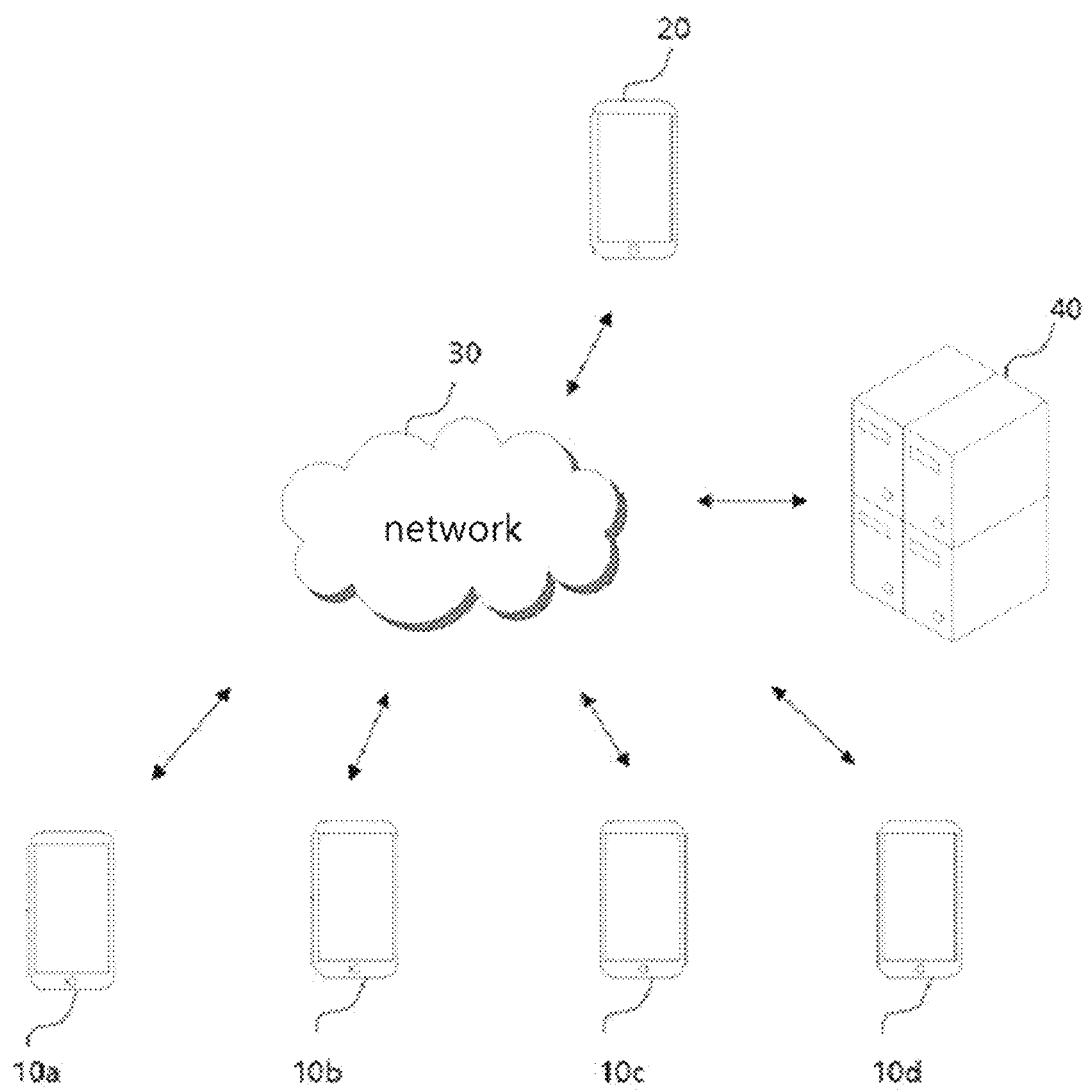
FIG. 1 is a diagram illustrating a personalized messaging service system according to an embodiment of the present invention.

Hereinafter, exemplary embodiments of the present invention will be described in more detail with reference to the drawings.

Since the present invention may have various changes and have various forms, specific exemplary embodiments are illustrated in the drawings and described in detail in the text. However, it is not intended to limit the present invention to the specific disclosed form, and it will be appreciated that the present invention includes all modifications, equivalences, or substitutions included in the spirit and the technical scope of the present invention.

Figure 2:
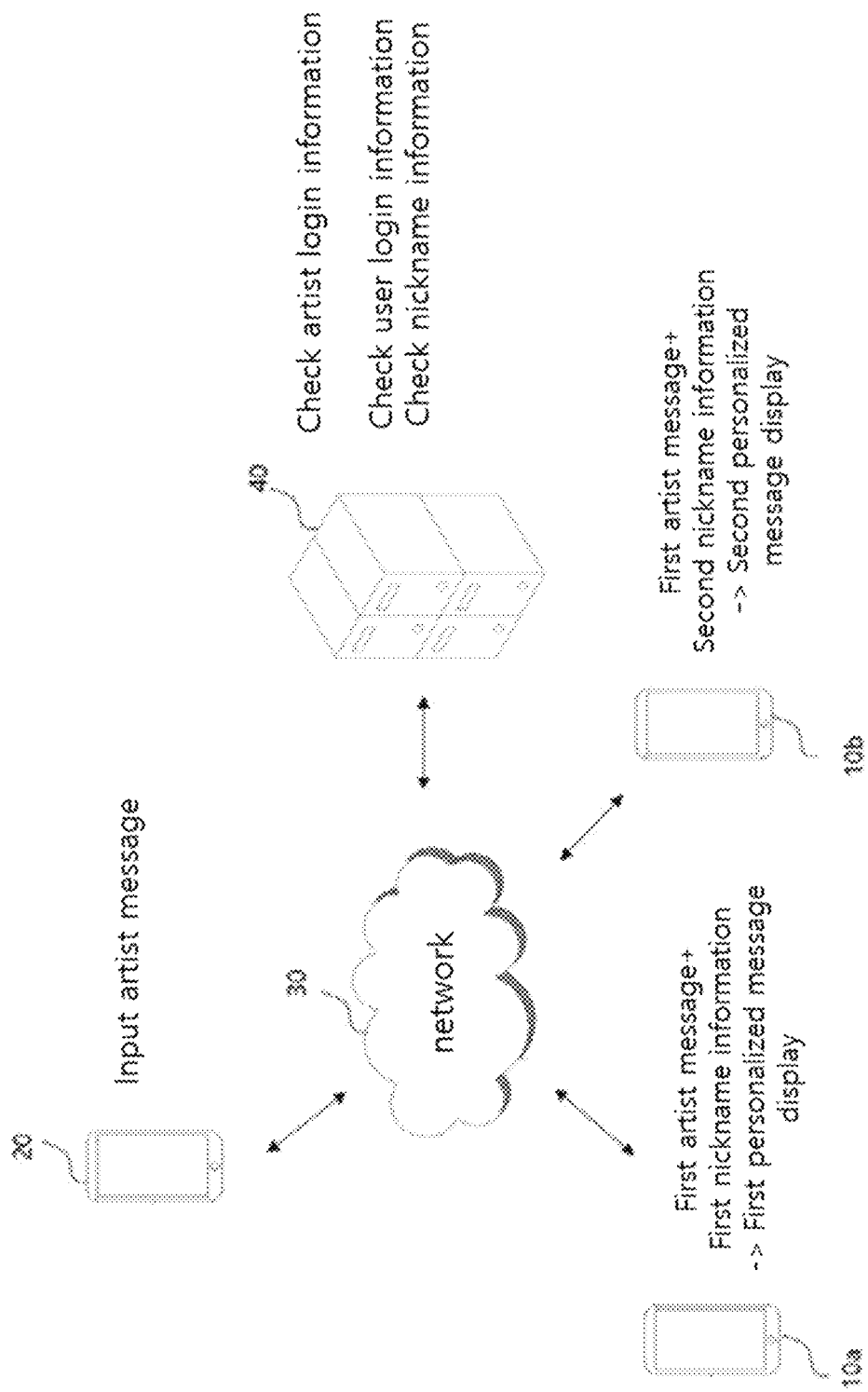
FIG. 2 is a diagram illustrating one artist and two users using a personalized messaging service system according to an embodiment of the present invention.

FIG. 1 is a diagram illustrating a personalized messaging service system according to an embodiment of the present invention. FIG. 2 is a diagram illustrating one artist and two users using a personalized messaging service system according to an embodiment of the present invention.

Referring to FIGS. 1 and 2, the personalized messaging service system may include a plurality of user terminals (10a, 10b, 10c, 10d), an artist terminal 20, a network 30, and a central server 40.

The user terminal may include a first user terminal 10a, a second user terminal 10b, a third user terminal 10c, and a fourth user terminal 10d.

The first to fourth user terminals 10a, 10b, 10c, and 10d may be smart devices used by the first to fourth users, respectively. Here, the smart device is a computer or portable terminal, each user may receive a personalized messaging service by connecting to the central server 40 through the network 30 in the form of a web app, application, or web app through the user terminals 10a, 10b, 10c, and 10d. Here, the personalized message is a message delivered by one artist to multiple users, and is a personalized message in which at least some terms are modified to include the user information using each user's unique user information. That is, depending on the user information, the first personalized message delivered to the first user and the second personalized message delivered to the second user may be at least partially different from each other.

The first to fourth users may input respective user messages through the first to fourth user terminals 10a, 10b, 10c, and 10d. The user message may be entered in a chat room where the personalized message is displayed, so that each of the first to fourth users may receive a user experience through the service as if they are chatting 1:1 with one artist.

Through this, users may feel a more intimate sense of communication, by allowing multiple users to communicate with one artist through private 1:1 chat, breaking away from the existing one-to-many format of one-sided communication.

Meanwhile, the computer may include, for example, a desktop, laptop, or tablet PC equipped with a web browser. The portable terminal is, for example, a wireless communication device that guarantees portability and mobility, and may include all types of handheld-based wireless communication devices such as smartphone, PCS (Personal Communication System), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet) terminal, etc.

A user app may be installed on each user terminal 10a, 10b, 10c, and 10d. Through the user app, the first to fourth users may use a personalized chat service with the desired artist. A detailed description of the user app will be described later in the description of FIG. 3.

The user terminals 10a, 10b, 10c, and 10d are configured to connect to the central server 40 through the network 30 and transmit and receive data according to commands of the user app.

Here, the network 30 may be implemented using a mobile communication network, and the mobile communication network may include, but is not limited to, WAN (Wide Area Network), PAN (Personal Area Network), 3G, 4G, LTE, 5G and Wi-Fi, etc.

Meanwhile, the user may log in to the user account using his or her user terminal and then proceed with payment for each artist to use the service. The payment is provided in the form of a period-based payment service, for example, a monthly subscription-type automatic renewal product, which can encourage continuous purchases and service maintenance.

The artist terminal 20 may be a smart device used by an artist. The artist terminal 20 may receive an artist message including the nickname identification code. The artist terminal 20 may display user messages input by users who have subscribed to the artist.

The artist message may further include a subscription date identification code. In this case, the personalized message may be created by replacing the subscription date identification code of the artist message with the subscription date information of the user. The subscription date information may refer to the number of days (date) that the user subscribed to the corresponding artist. For example, the user's subscription date information may be generated in the central server 40 or each user terminal 10a, 10b, 10c, and 10d according to the payment information for each user.

Meanwhile, the personalized message may be generated in the central server 40 or in an individual user terminal 10a, 10b, 10c, and 10d. If necessary, the personalized message may be generated in both the central server 40 and the user terminal 10a, 10b, 10c, and 10d.

Referring again to FIG. 2, the creation of a personalized message will be described in detail. As an example, a personalized messaging service system will be described when each of the first user and the second user subscribes to an artist.

The artist uses the artist terminal 20 to input an artist message. The artist message may include the nickname identification code or the subscription date identification code.

The artist message may be transmitted to the central server 40 through the network 30. The central server 40 may check the artist login information of the artist, check the user login information of the first user, and retrieve the user information of the first user. The user information of the first user may include first nickname information and first subscription date information. The first nickname information is directly designated by the first user, and the first artist may designate a desired word as a title for himself. The first subscription date information is the number of subscription days for which the first user subscribed to the first artist, and may be generated using the first user's payment information.

Meanwhile, in this embodiment, it has been described that the first personalized message is generated in the central server 40, but the present invention is not limited to this. For example, the task of replacing the nickname identification code with nickname information to generate the first personalized message may be performed directly on the user's individual user terminal, so that the system may be implemented in a way to reduce the computational load of the central server 40.

The nickname identification code and the subscription date identification code of the first artist message may be replaced with the first nickname information and the first subscription date information to generate the first personalized message. The first personalized message is displayed on the first user terminal 10a of the first user, and in the chat room of the dedicated app on the first user's smartphone terminal, it may be displayed as if the first artist sent a 1:1 chat message to the first user.

Additionally, the nickname identification code and the subscription date identification code of the first artist message may be replaced with the second nickname information and the second subscription date information of the second user to generate the second personalized message. The second personalized message may be displayed on the second user terminal 10b of the second user.

In this way, by creating a personalized message, multiple users can communicate with one artist through private 1:1 chat, breaking away from the existing one-to-many format of one-way communication and allowing users to feel a more intimate sense of communication.

Figure 3:
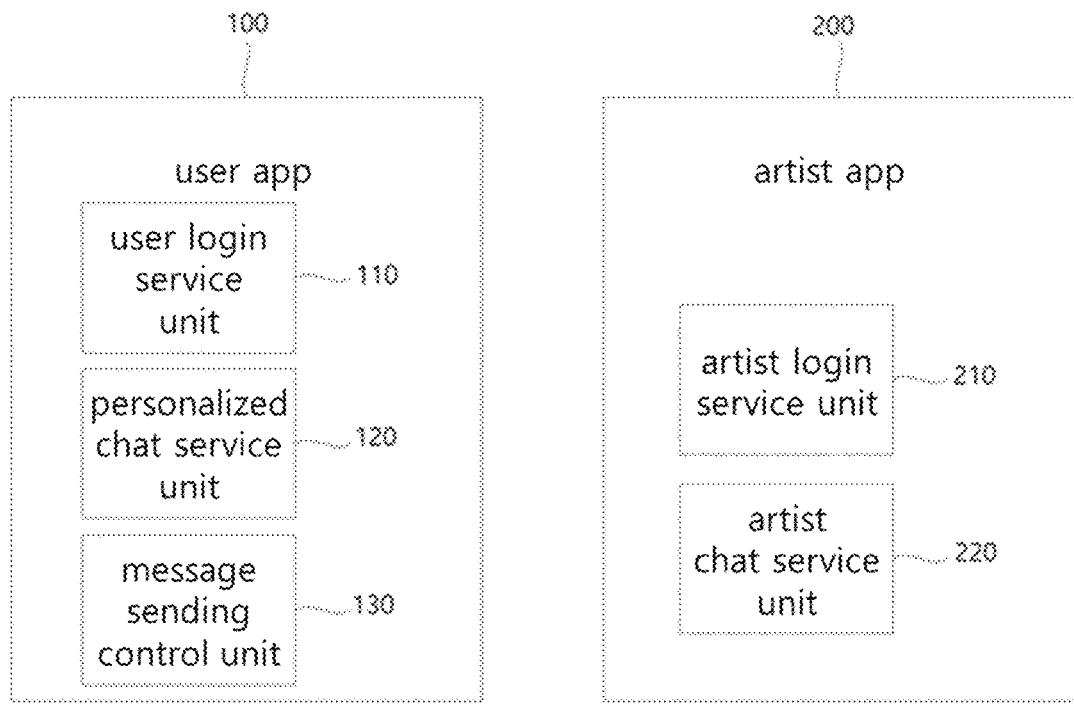
FIG. 3 is a block diagram illustrating a user app implemented in a user terminal and an artist app implemented in an artist terminal of a personalized messaging service system according to an embodiment of the present invention.
Figure 4:
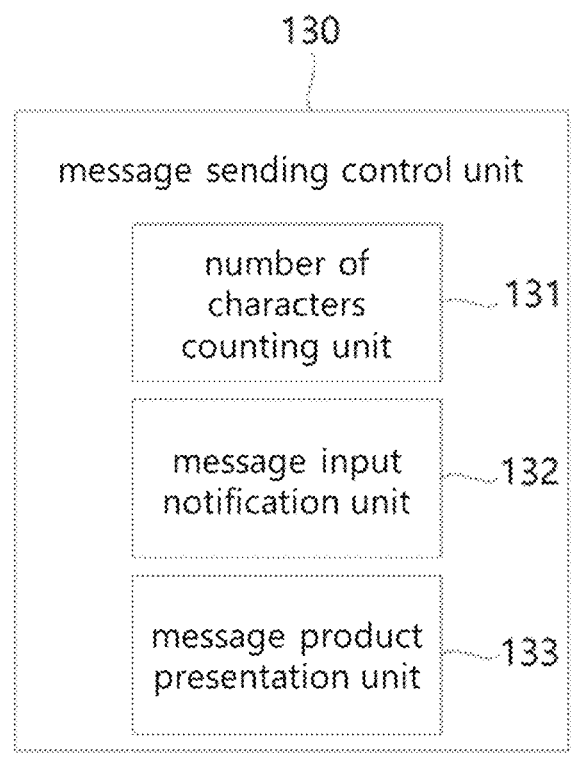
FIG. 4 is a block diagram for explaining the message sending control unit of the user app implemented in the user terminal.

FIG. 3 is a block diagram illustrating a user app implemented in a user terminal and an artist app implemented in an artist terminal of a personalized messaging service system according to an embodiment of the present invention. FIG. 4 is a block diagram for explaining the message sending control unit of the user app implemented in the user terminal. FIG. 5 is an example diagram of a user interface (UI) of a user app of a personalized messaging service method according to an embodiment of the present invention.

Referring to FIGS. 1 to 5, the user app 100 is installed on the user terminal and communicates with a central server through a network to perform user account login and personalized chat service functions with an artist.

The user app 100 may include a login service unit 110 that provides login service for user accounts, a personalized chat service unit 120 that displays the personalized message and receives a user message, and a message sending control unit 130 that limits the message sending function based on user information.

After logging into the user account, the user can proceed with payment to use the service. The payment is provided in the form of a period-based payment service, for example, it can be provided as a monthly subscription-type auto-renewing product to encourage continuous purchase and service maintenance.

Pre-entered user information may be stored in the user account. For example, the user information may be a nickname, anniversary information, subscription date information, etc. previously stored in the user account. Additionally, the user information may include location information recognized from the user terminal.

The nickname is a term used by an artist to refer to a user, and can be set by the user through the user app 100. The anniversary information is, for example, a date on which the artist wishes to commemorate the user's anniversary, such as the user's birthday, and can be set by the user through the user app 100. The subscription date information is the date the user started paying to use the service and can be used to indicate the date the user subscribed to the corresponding artist.

In this embodiment, the user information may include a nickname, anniversary information, subscription date information, location information, etc., but is not limited thereto and may include the user's personalized data that can be used to create a personalized message. For example, personalized data such as the user's language, blood type, and payment information may be further included in the user information.

The personalized chat service unit 120 may receive and display a personalized message created based on an artist message sent by an artist, and receive a user message, which is a message sent by the user to the artist. The user message may include at least one of text and content. The content may include at least one of a photo, video, or voice.

The message sending control unit 130 is configured to limit the message sending function based on user information, and is configured to support sending by expanding the number of characters the user can write in the message through point or product payment. For example, the message sending control unit 130, based on the subscription date information for each user's artist, when the subscription date exceeds a specific date, differentiated services may be provided, such as improving the number of characters in the text of a reply message that a user sends to an artist, or allowing a photo to be attached to the reply message.

For example, the specific date may gradually increase the number of characters by a certain amount or depending on the anniversary. For example, the subscription date is 30 characters for days 1 to 49, 50 characters for 50 days, 77 characters for 77 days, and thereafter, the number of characters that can be entered can be increased by 100 characters in 100-day increments. Meanwhile, in this embodiment, the message sending control unit restricts the message sending function based on the subscription date for each artist as an example, but the present invention is not limited to this. For example, restrictions may be made based on the service subscription date rather than the subscription date for a specific artist.

The message sending control unit 130 may include a number of characters counting unit 131, a message input notification unit 132, and a message product presentation unit 133.

The number of characters counting unit 131 may display the number of characters of a message that the user can write based on user information from the user account. Based on this, when the user enters a user message in the chat window, the number of characters is counted and the number of characters currently entered or the number of remaining characters is displayed in the chat window.

The message input notification unit 132 is configured to initially notify that sending is not possible when the user message the user attempted to send exceeds the number of characters that can be entered. In addition, not only when the number of characters is exceeded, but also when attachment of content such as photos is restricted to messages that can be written by each user, and when the user attempts to send with content such as photos attached, you may initially be notified that delivery is not possible.

Thereafter, the message input notification unit 132 is configured to present a selection window to the user to determine whether to modify the content of the user message or to send the entered user message as is. However, it is not limited to this. When the number of characters in the message entered by the user exceeds the allowed number of characters, the message input notification unit may be configured to immediately notify a notification for content modification or to deactivate the chat window so that text can no longer be entered.

The message product presentation unit 133 is configured to present a message product, which is a paid product, to the user terminal when a user message that cannot be sent is selected to be sent as is. Additionally, when paying for a paid product, the user may send the corresponding message, and when the paid product is not paid, the user may move to the step of editing the message content. Meanwhile, in addition to paid products, user evaluation information, such as points based on the user's use of the messaging service, for example, payment can also be made with feedback points granted from artists, points awarded for providing quick feedback on artist messages, and points accumulated depending on payment.

Accordingly, by limiting the ability to send messages to artists based on user evaluation information such as user subscription dates, expanding the number of characters of text of the reply message to artists, or attaching photos to user messages, it is possible to motivate users and form a sound fandom culture in the service of one-on-one instant messages between artists and users in which personal communication takes place.

The artist app 200 is installed on the artist terminal and communicates with the central server 40 through a network to perform an artist chat service function that logs in to the artist account and delivers and receives messages to users who are multiple fans.

The artist app 200 may include an artist login service unit 210 that provides a login service for an artist account, a chat input unit 220 in which an artist's message is input, and an artist chat service unit 230 that receives a user message from a user.

The artist login service unit 210 is configured to manage the artist's account that identifies the artist, and the artist may use the service after logging into the artist's account.

The chat input unit 220 is a window where an artist inputs an artist message, and an artist message including one or more predetermined identification codes may be input. For example, when an artist writes ??(@(@ (@) ?? as an identification code in the text of an artist message, it is displayed in the subscriber's 1:1 chat room, replaced with the subscriber's nickname. (Example: When the preset nickname is 'Jinyoung', (a)(a)(@) what are you doing?→What are you doing Jinyoung?) Meanwhile, in the case of a postposition adjacent to the identification code, it may be automatically changed to an appropriate postposition, added, or deleted depending on the type of consonant of the last letter of the replaced user information. At this time, the postposition entered immediately without a space after the identification code of the artist message is recognized as the adjacent postposition, and may be changed to an appropriate postposition, added, or deleted. (Example: When the preset nickname is 'Jinyoung', (@ @ @), what are you doing?→Jinyoung, what are you doing?)

Meanwhile, the identification code may include a nickname identification code, an anniversary identification code, a subscription date identification code, and a location information identification code. Additionally, the artist app may provide the artist's own review screen before sending the artist message so that the artist can review the message written by the artist.

Through the chat input unit 220, the artist may register the entered artist message in the chat window. Registered artist messages are placed in a state waiting to be sent according to predetermined standards, and may then be sent by manipulating the artist in the chat window. However, it is not limited to this.

It can be sent automatically after a certain period of time without any manipulation by the artist, or by the artist's selection, each artist message can be placed on standby for transmission as a temporary storage function, or can be manipulated to be sent immediately upon registration.

Additionally, the artist may input a reservation message or artist event message through the chat input unit 220. Thereafter, a personalized reservation message or personalized event message may be created using this, and the personalized reservation message or personalized event message may be displayed through the user app at a predetermined reservation time or when an event occurs. For example, messages may be scheduled for special anniversaries, and messages may be sent on specific dates such as Christmas, Valentine's Day, or the user's birthday.

For example, a specific time of a user's birthday included in the user information may be set as a reservation time, and an artist reservation message containing a birthday celebration message including an identification code may be converted into a personalized reservation message and sent to the user app 100 at the reservation time. Or an artist event message containing an artist subscription audit message containing an identification code may be converted into a personalized event message and transmitted to the user app 100 when a monthly subscription payment (event occurs).

The artist chat service unit 260 may display artist messages sent to multiple users, and receive and display the user messages from multiple users. That is, the artist chat service unit 260 is configured to display an artist message transmitted to a user app of each of the at least one user terminal, and to receive and display a user message through the user app.

Meanwhile, through the artist chat service unit 260, artists may evaluate user messages with 'likes', etc., and the evaluations may be accumulated and managed in the form of points for each user that can be used as cash.

Through this, many fans may experience a private 1:1 chat room where they can chat with the artist, and the artist may efficiently provide services to many fans. In particular, since artist apps and user apps are easily implemented through terminals such as smartphones, the service may be accessed quickly and easily regardless of location and time, satisfying the needs of users as fans who want quick information about the artist and the artist's real-time status.

Meanwhile, the user information may include the user language used by the user. When the artist message is written in a language other than the standard language, it is translated into the preset standard language. The central server 40 or the user app 100 translates the reference language into the user language, and the translation of the user language may be performed through machine translation or artificial intelligence translation.

Additionally, in transmitting the user message to the artist app 100, the central server 40 may filter messages with inappropriate content and block transmission of the user message to the artist app 100 when the user message includes inappropriate content.

When the user message includes text, the filtering may use character recognition technology to compare whether a preset forbidden word is included. In addition, when the user message includes an image or video, the filtering may use image or video recognition technology to compare whether it includes a preset prohibited image.

FIG. 6 is a flowchart illustrating a personalized messaging service method according to an embodiment of the present invention.

Referring to FIGS. 1 to 6, the personalized messaging service method may include artist message input step S100, personalized message creation step S200, personalized message display step S300, user message input step S400, user message sending control step S500, and user message display step S600.

In the artist message input step S100, the artist may create an artist message including an identification code using the artist app installed on the artist terminal. At this time, the identification code may include a nickname identification code, an anniversary identification code, a subscription date identification code, and a location information identification code. Additionally, the artist app may provide the artist's own review screen before sending the artist message so that the artist can review the message written by the artist. When the message input is completed, the artist message is registered.

In the personalized message creation step (S200), when the artist message including an identification code is registered from the artist, the identification code of the artist message may be replaced with the corresponding user information to generate a personalized message.

The nickname identification code of the artist message is replaced with the nickname, the anniversary identification code is replaced with the anniversary, and the subscription date identification code and location information identification code are replaced with the location information to generate the personalized message.

For example, when an artist writes ?? (@ (@(@) ?? as an identification code in the text of an artist message, it is displayed in the subscriber's 1:1 chat room, replaced with the subscriber's nickname. (Example: When the preset nickname is 'Jinyoung', (@@@ what are you doing?→What are you doing Jinyoung?) Meanwhile, in the case of a postposition adjacent to the identification code, it may be automatically changed to an appropriate postposition, added, or deleted depending on the type of consonant of the last letter of the replaced user information. At this time, the postposition entered immediately without a space after the identification code of the artist message is recognized as the adjacent postposition, and may be changed to an appropriate postposition, added, or deleted. (Example: When the preset nickname is 'Jinyoung', (@)(a) @), what are you doing?→Jinyoung, what are you doing?)

Additionally, the artist app can receive artist reservation messages or artist event messages. Thereafter, a personalized reservation message or personalized event message may be created using this, and the personalized reservation message or personalized event message may be displayed through the user app at a predetermined reservation time or when an event occurs. For example, messages may be scheduled for special anniversaries, and messages may be sent on specific dates such as Christmas, Valentine's Day, or the user's birthday.

Additionally, based on information on user languages used by users, messages sent by artists may be translated into languages used by users and provided. For example, when the user information includes the user language used by the user, and the artist message is written in a language other than the standard language, it is translated into the preset reference language, and the reference language is translated into the user language, thereby creating a translated personalized message. At this time, the translation of the user's language may be done through machine translation or artificial intelligence translation, and various known machine translation or artificial intelligence translation systems may be used.

In the personalized message display step S300, each personalized message may be displayed on the user terminal of each of the plurality of users. For example, the user terminals may include a first user terminal and a second user terminal, user information of the user account logged in to the first user terminal may include first user information, and user information of the user account logged in to the second user terminal may include second user information. The identification code of the artist message may be replaced with the first user information to generate a first user personalized message from the artist message. And the identification code may be replaced with the second user information to generate a second user personalized message from the artist message. The first user personalized message may be displayed on the first user terminal, and the second user personalized message may be displayed on the second user terminal.

In the user message input step S400, each of a plurality of users may write a user message using a user terminal. That is, the user who receives the personalized message may write a user message that is user feedback as a reply message to the artist.

In the user message sending control step S500, it is configured to limit the message sending function based on user information for the user message entered by the user, and is configured to support sending by expanding the number of characters of the message that the user can write through points or product payment.

For example, using the subscription date information for each user, when the date of subscription to the artist exceeds a certain date, differentiated services may be provided, such as improving the number of characters in the text of a reply message that a user sends to an artist, or allowing a photo to be attached to the reply message.

For example, the specific date may gradually increase the number of characters by a certain amount or depending on the anniversary. For example, the subscription date is 30 characters for days 1 to 49, 50 characters for 50 days, 77 characters for 77 days, and thereafter, the number of characters that can be entered may be increased by 100 characters in 100-day increments.

Specifically, the number of characters in a message that a user can write may be displayed based on user information from the user account. Based on this, when the user enters a user message in the chat window, the number of characters is counted and the number of characters currently entered or the number of remaining characters is displayed in the chat window.

In the user message input step S400, when a user message is input and the user message attempted to be sent by the user exceeds the number of characters that can be entered, a notification is initially provided indicating that sending is not possible. In addition, not only when the number of characters is exceeded, but also when attachment of content such as photos is restricted to messages that can be written by each user, and when the user attempts to send with content such as photos attached, you may initially be notified that delivery is not possible.

Thereafter, a selection window is presented to the user to determine whether to modify the content of the user message or to send the entered user message as is. However, it is not limited to this. When the number of characters in the message entered by the user exceeds the allowed number of characters, a notification for content modification may be immediately provided, or the chat window may be deactivated so that characters can no longer be entered.

When a user message that exceeds the permissible range for each user is selected to be sent as is, a paid message product is presented to the user terminal. Additionally, when paying for a paid product, the user may send the corresponding message, and when the paid product is not paid, the user may move to the step of editing the message content. Meanwhile, in addition to paid products, payment may also be made using the user's evaluation information, such as points based on the user's use of the messaging service, for example, feedback points granted by the artist, points awarded when a quick feedback message is provided in response to the artist's message, and points accumulated according to payment.

Accordingly, by restricting the sending function of messages sent to artists based on user evaluation information such as user subscription date, and expanding the number of characters in the text of the reply message sent to the artist or allowing photos to be attached to the user message, in the service of one-to-many instant messaging between artists and users where personal communication takes place, it may motivate users and create a healthy fandom culture at the same time.

Additionally, the user app may display the sent user message along with an identification mark indicating whether the user message has been read by the artist. The identification mark of the user message may be changed to a read mark after a certain or random period of time within a predetermined time range, even if the artist does not check the user message. When the artist enters the next artist message, the identification mark may be changed to a read mark. Through this, the user can recognize that the artist has confirmed his or her user message.

In the user message display step S600, a plurality of user messages may be received and displayed on the artist terminal. Through this, artists may check messages sent by users. In order to manage this efficiently, by storing the user messages corresponding to each message sent by the artist, when an artist needs to, they may easily find user messages for a specific artist message.

Meanwhile, before displaying the user message on the artist app, messages with inappropriate content may be filtered, and when the user message contains inappropriate content, transmission of the user message to the artist app may be blocked. When the user message includes text, the filtering may use character recognition technology to compare whether a preset forbidden word is included. When the user message includes an image or video, image or video recognition technology may be used to compare whether it includes a preset prohibited image.

Additionally, a user's account that sends user messages subject to filtering more than a specified number of times may be designated as a black account, completely blocking future transmission of user messages.

The user messages may be stored in chronological order in the artist app, or sorted according to preset priorities and displayed to the artist. For example, users may be sorted in order of most loyal users with the highest number of subscriptions, so that artists can check user messages from loyal users first.

According to embodiments of the present invention, the personalized messaging service system allows an artist to write an artist message through the artist app, convert the personalized information of each of the plurality of users into a personalized message for each of the plurality of users, and display it on the user app. Accordingly, by communicating through a private 1:1 chat room between artists and users using personalized messages, it is possible to provide a service where users feel a more intimate sense of communication, breaking away from the existing one-to-many format of one-sided communication. In particular, since a small number of artists can efficiently provide a 1:1 chat service with a large number of users, a new communication system can be provided based on intimate communication between celebrities and fans.

Additionally, according to embodiments of the present invention, by limiting the ability to send messages to artists based on user evaluation information such as subscription date, in the service of one-to-many instant messaging between artists and users where personal communication takes place, it is possible to motivate users and create a healthy fandom culture at the same time.

Although the present invention has been described with reference to the above exemplary embodiments, it will be understood by those skilled in the art that various modifications and changes may be made to the present invention without departing from the spirit and scope of the present invention as set forth in the claims below.

What is claimed is:

1. A personalized messaging service system comprising:
    an artist terminal in which an artist app is installed and communicates with a central server over a network, and an artist message comprising an identification code is registered through the artist app;
    at least one user terminal on which a user app is installed and communicates with a central server through the network, and a personalized message converted from the artist message is displayed based on the identification code; and
    the central server that communicates with the at least one user terminal and the artist terminal using the network,
    wherein the user app comprises:
        a user login service that provides a login service for a user account;
        a message sending controller configured to limit sending of a user message according to predetermined standards, based on user information of the user account; and
        a user chat service configured to send the user message and display the personalized message converted from the artist message based on the identification code in a chat window,
        wherein the message sending controller limits a number of characters in a text of a user message input from a user and limits the number of characters in a text of a user message for each artist to be sent based on a subscription date information for each artist among the user information.

2. The personalized messaging service system of claim 1, wherein the message sending controller comprises:
    a number of characters counter which displays a number of characters of text in a user message that can be sent by the user based on user information, and counts the number of characters in the text of the user message input from the user and displays at least a number of characters currently entered and a number of remaining characters in the chat window;
    a message input notifier which notifies that the message cannot be sent when the user message exceeds the number of characters that can be sent; and
    a message product presentation which presents message products so that messages can be sent through point or paid product payment for user messages that cannot be sent.

3. The personalized messaging service system of claim 2, wherein the message input notifier, when the user message exceeds the number of characters that can be sent, firstly notifies that sending is impossible, and secondarily notifies to select to modify a content of a user message or to send the user message through the message product.

4. The personalized messaging service system of claim 1, wherein the message sending controller restricts an inclusion of a content comprising at least one of a photo, video, or voice in the input user message.

5. The personalized messaging service system of claim 1, wherein the message sending controller limits the number of characters of the text of the user message to be sent based on a personalized messaging service subscription date information among the user information.

6. The personalized messaging service system of claim 2, wherein the point comprises at least one of feedback points granted from a subscribed artist and points awarded when a quick feedback message is provided in response to an artist message.

7. A personalized messaging service method comprising:
    utilizing a personalized messaging service system comprising an artist terminal in which an artist app is installed and communicates with a central server over a network, and an artist message comprising an identification code is registered through the artist app, at least one user terminal on which a user app is installed and communicates with a central server through the network, and a personalized message converted from the artist message is displayed based on the identification code, and the central server that communicates with the at least one user terminal and the artist terminal using the network,
    wherein the user app comprises:
    a step to provide a login service for a user account;
    a step of restricting sending of a user message according to a predetermined standard based on user information of the user account when the user message is input from a user; and
    a step of sending the user message and displaying a personalized message converted from the artist message on a chat window based on the identification code,
    wherein the step of restricting the sending of the user messages limits a number of characters in a text of the user message input from the user and limits a number of characters in a text a user message for each artist to be sent based on subscription date information for each artist among the user information.

* * * * *